United States Patent
Carnevale et al.

(10) Patent No.: US 10,902,099 B2
(45) Date of Patent: *Jan. 26, 2021

(54) DEBUGGABLE OBFUSCATED SCRIPT

(71) Applicant: International Business Machines Corporation, Armonk, NY (US)

(72) Inventors: Giulia Carnevale, Rome (IT); Marco Gianfico, Sant'Antimo (IT); Ciro Ragusa, Rome (IT); Roberto Ragusa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,458

(22) Filed: Jul. 12, 2019

(65) Prior Publication Data
US 2019/0340340 A1    Nov. 7, 2019

Related U.S. Application Data

(63) Continuation of application No. 15/870,967, filed on Jan. 14, 2018, now Pat. No. 10,558,788.

(51) Int. Cl.
*G06F 21/14* (2013.01)
*G06F 16/958* (2019.01)
*G06F 16/955* (2019.01)

(52) U.S. Cl.
CPC .......... *G06F 21/14* (2013.01); *G06F 16/9566* (2019.01); *G06F 16/986* (2019.01); *G06F 2221/0748* (2013.01)

(58) Field of Classification Search
CPC .... G06F 21/14; G06F 16/986; G06F 16/9566; G06F 2221/0748; G06F 2221/2107
See application file for complete search history.

(56) References Cited

U.S. PATENT DOCUMENTS

| | | | |
|---|---|---|---|
| 9,124,560 B1 | 9/2015 | Vemula et al. | |
| 9,241,004 B1* | 1/2016 | April | G06F 21/60 |
| 9,497,252 B2 | 11/2016 | Harter | |
| 9,830,478 B1* | 11/2017 | Hale | G06F 21/71 |

(Continued)

OTHER PUBLICATIONS

Wu et al., "RIM: a Method to Defend from JIT Spraying Attack", 2012, IEEE, pp. 143-148. (Year: 2012).*

(Continued)

*Primary Examiner* — Matthew Smithers
(74) *Attorney, Agent, or Firm* — Scott S. Dobson

(57) ABSTRACT

A method for generating debuggable obfuscated script includes embedding into a Web page, a query to a data store of a client for a key disposed within fixed storage of the client, further embedding into the Web page both an encrypted network reference to an un-obfuscated, clear form of a script, the encrypted network reference being decryptable with the key, and also an un-encrypted reference to an obfuscated form of the script and yet further embedding into the Web page, a selection directive selecting and decrypting the encrypted network reference to retrieve the un-obfuscated form upon loading the Web page on the condition that the key is found in the fixed storage, but otherwise selecting the un-encrypted reference to retrieve the obfuscated form. The method additionally includes serving the Web page to the client.

6 Claims, 2 Drawing Sheets

(56) References Cited

U.S. PATENT DOCUMENTS

| | | | |
|---|---|---|---|
| 9,887,969 B1* | 2/2018 | Shemesh | H04L 9/0643 |
| 10,142,306 B1* | 11/2018 | Shemesh | H04L 63/0428 |
| 10,558,788 B2* | 2/2020 | Carnevale | G06F 21/14 |
| 2012/0124372 A1* | 5/2012 | Dilley | H04L 63/0471 |
| | | | 713/162 |
| 2014/0068269 A1* | 3/2014 | Zhou | G06F 16/9535 |
| | | | 713/171 |
| 2016/0132667 A1* | 5/2016 | Freitas Fortuna dos Santos | |
| | | | H04L 9/0822 |
| | | | 713/189 |
| 2016/0337324 A1* | 11/2016 | Sullivan | H04L 9/14 |
| 2016/0357530 A1* | 12/2016 | Cheng | G06F 8/47 |
| 2018/0373849 A1* | 12/2018 | Gidley | G06F 21/16 |

OTHER PUBLICATIONS

Debug X++ Against a Production Database, Microsoft.com, Nov. 20, 2017.

* cited by examiner

DEBUGGABLE OBFUSCATED SCRIPT

BACKGROUND OF THE INVENTION

Field of the Invention

The present invention relates to code obfuscation.

Description of the Related Art

Code obfuscation refers to the deliberate act of creating source or machine code that is difficult for humans to understand. Like obfuscation in natural language, code obfuscation may incorporate nonsensical or unintelligible content, excessive verbiage and the like in order to compose programmatic statements. Program code is often obfuscated to protect the intellectual property reflected in the program code and to prevent a malicious actor from reverse engineering a proprietary computer program. Mechanically, obfuscation tools achieve obfuscation by encrypting some or all of the program code, stripping out from the program code potentially revealing meta-data, renaming useful class and variable names to meaningless labels or adding unused or meaningless code to an application binary. Thus, a conventional obfuscation tool may be used to automatically convert straight-forward source code into a program that works the same way, but is much harder to read and understand.

Code obfuscation finds ready application in the use of scripted elements of a Web page distributed by a Web server over the World Wide Web. Generally, automated code obfuscation tools respond to a request for a Web page containing programmatic script elements such as script conforming to the Javascript type scripting language by identifying the script elements amongst the markup elements of the Web page and processing the clear script elements into obfuscated script elements and replacing the clear script elements in the Web page with the obfuscated script elements before serving the Web page to a requesting client. In the absence of an error in run-time interpretation and execution of the obfuscated script elements, no one is the wiser. However, when an error does occur, debugging becomes required.

Generally, debugging errant script elements in a Web page requires little more than reviewing a log of error messages to identify the errant code and also any corresponding variables and associated line numbers so as to correlate the errors with the offending portions of the code. But, once the script elements have become obfuscated, it may not be possible to identify a correlation between the offending portions of the code and respective entries in the error log.

BRIEF SUMMARY OF THE INVENTION

Embodiments of the invention address deficiencies in code obfuscation and provide for a novel and non-obvious method, system and computer program product for the generation of debuggable obfuscated script. A method for generating debuggable obfuscated script includes embedding into a Web page, a query to a data store of a client requesting the Web page for a key disposed within fixed storage of the client. further embedding into the Web page both an encrypted network reference to an un-obfuscated, clear form of a script, the encrypted network reference being decryptable with the key, and also an un-encrypted reference to an obfuscated form of the script and yet further embedding into the Web page, a selection directive selecting and decrypting the encrypted network reference so as to retrieve the un-obfuscated, clear form of the script upon loading the Web page in the client on the condition that the key can be found in the fixed storage in response to the query, but otherwise selecting the un-encrypted reference so as to retrieve the obfuscated form of the script upon loading the Web page in the client. The method additionally includes serving the Web page to the client over a computer communications network in response to a request by the client to retrieve the Web page.

In one aspect of the embodiment, the key is stored in a cookie in the fixed storage of the client. In another aspect of the embodiment, the script is script interpretable in a virtual machine and, for example, comports with the Javascript scripting language. In yet another aspect of the embodiment, the network reference is a uniform resource locator (URL). Finally, in even yet another aspect of the embodiment, the selection directive further confirms a checksum of the decrypted form of the encrypted network reference before permitting a selection of the decrypted form of the encrypted network reference.

In another embodiment of the invention, a data processing system is configured for generating debuggable obfuscated script. The system includes a host computing system comprising at least one computer with memory and at least one processor and a Web server adapted to serve a Web page to a requesting client. The system additionally includes a code obfuscation module embedded in the Web page. The module includes programmatic code that includes a query to a data store of the requesting client for a key disposed within fixed storage of the client, both an encrypted network reference to an un-obfuscated, clear form of a script, the encrypted network reference being decryptable with the key, and also an un-encrypted reference to an obfuscated form of the script and a selection directive configured to select and decrypt the encrypted network reference so as to retrieve the un-obfuscated, clear form of the script upon loading the Web page in the client on the condition that the key can be found in the fixed storage in response to the query, but otherwise selecting the un-encrypted reference so as to retrieve the obfuscated form of the script upon loading the Web page in the client.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the generation of debuggable obfuscated script. In accordance with an embodiment of the invention, programmatic code is embedded into a Web page and is adapted to include a query to a data store for a key disposed in fixed storage of a client recipient of the Web page. An encrypted network reference to an un-obfuscated, clear form of the code is also embedded in the programmatic code of the Web page, the encrypted network reference being decryptable with the key. As well, an un-encrypted reference to an obfuscated form of the code is embedded in the programmatic code. Finally, the Web page includes a selection directive selecting and decrypting the encrypted network reference so as to retrieve the un-obfuscated, clear form of the code upon loading the Web page in the client on the condition that the key can be found in the fixed storage in response to the query, but otherwise selecting the un-encrypted reference so as to retrieve the obfuscated form of the code upon loading the Web page in the client. Finally, the Web page is served to the client over a computer communications network.

Figure 1:
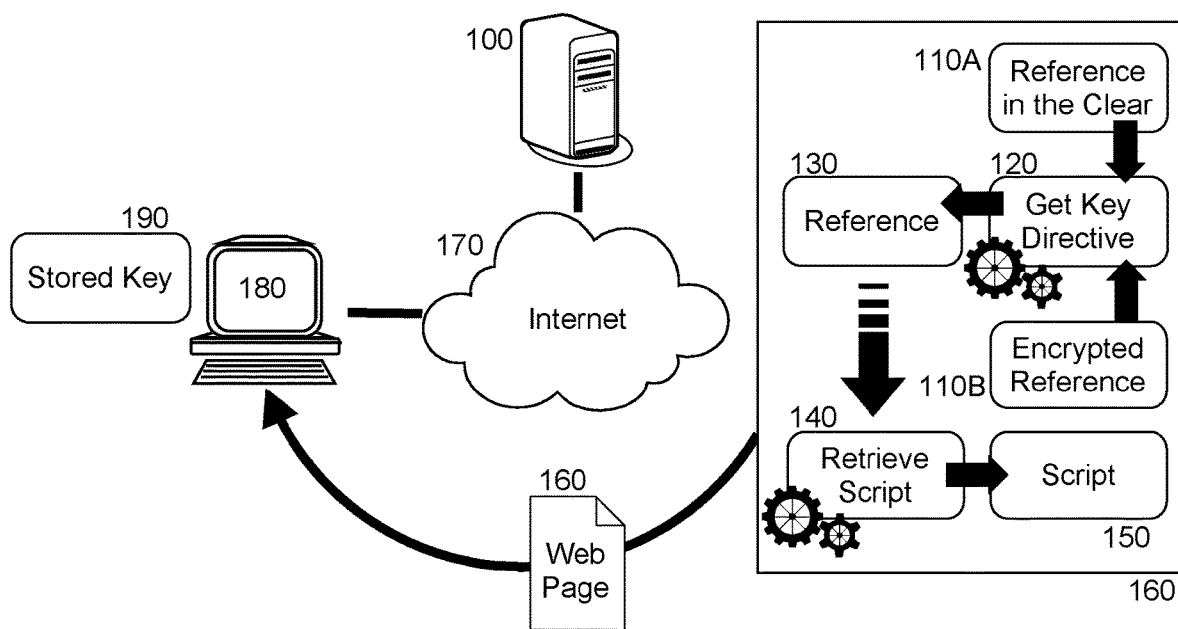
FIG. 1 is pictorial illustration of a process for generating debuggable obfuscated script.

In further illustration, FIG. 1 pictorially shows a process for generating debuggable obfuscated script. As shown in FIG. 1, a Web page 160 includes embedded herein two different references 110A, 110B to two different scripts— one encrypted and one unencrypted. The encrypted reference 110B may be decrypted utilizing a corresponding key 190 whereas the unencrypted reference 110A requires no key in order to be interpreted as a reference to a corresponding script. In response to a client 180 issuing to a corresponding server 100 from over the Internet 170 a request for the Web page 160, a get key directive 120 disposed within the Web page 160 attempts to retrieve the key 190 presumably stored within the client 180. If the get key directive 120 is able to locate the stored key 190, the get key directive 120 decrypts the encrypted reference 110B with the stored key 190 so as to produce a reference 130 to a script that is unobfuscated. However, if the get key directive 120 is unable to locate the stored key 190 in the client 180, the get key directive 120 returns the unencrypted reference 110A as the reference 130 to a script that is obfuscated. Thereafter, a retrieve script directive 140 retrieves a script 150 utilizing the reference 130. Finally, the Web server 100 provides the Web page 160 to the requesting client 180.

Figure 2:
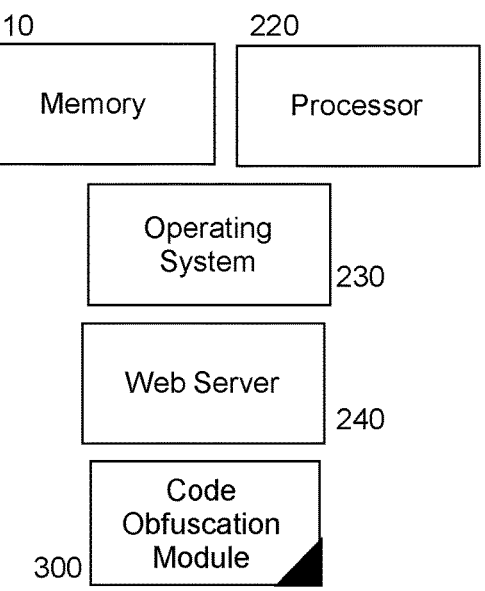
FIG. 2 is a schematic illustration of a data processing system configured for generating debuggable obfuscated script; and, FIG. 3 is a flow chart illustrating a process for generating debuggable obfuscated script.

The process described in connection with FIG. 1 may be implemented in a data processing system. In yet further illustration, FIG. 2 is a schematic illustration of a data processing system configured for generating debuggable obfuscated script. The system includes a host computer that includes memory 210 and at least one processor 220. An operating system 230 executes in the memory 210 by the at least one processor 220 and supports the operation of a Web server 240 adapted to respond to different requests by different communicatively coupled clients for Web pages by serving the Web pages to the requesting ones of the clients.

Notably, the system includes a code obfuscation module 300. The module 300 includes program code enabled upon execution in the memory 210 of the host computer to respond to a request for a Web page by determining if a stored key is present in the requesting client within a cookie. If so, the program code decrypts an encrypted reference to an unobfuscated form of a script interpretable in a virtual machine, such as a Javascript conformant script, utilizing the stored key. Otherwise, the program code utilizes an unencrypted reference to an obfuscated form of the same Javascript conformant script. Thereafter, the script is retrieved in accordance with the selected reference and included in the Web page. Finally, Web server 240 returns the Web page to the requesting client.

Figure 3:
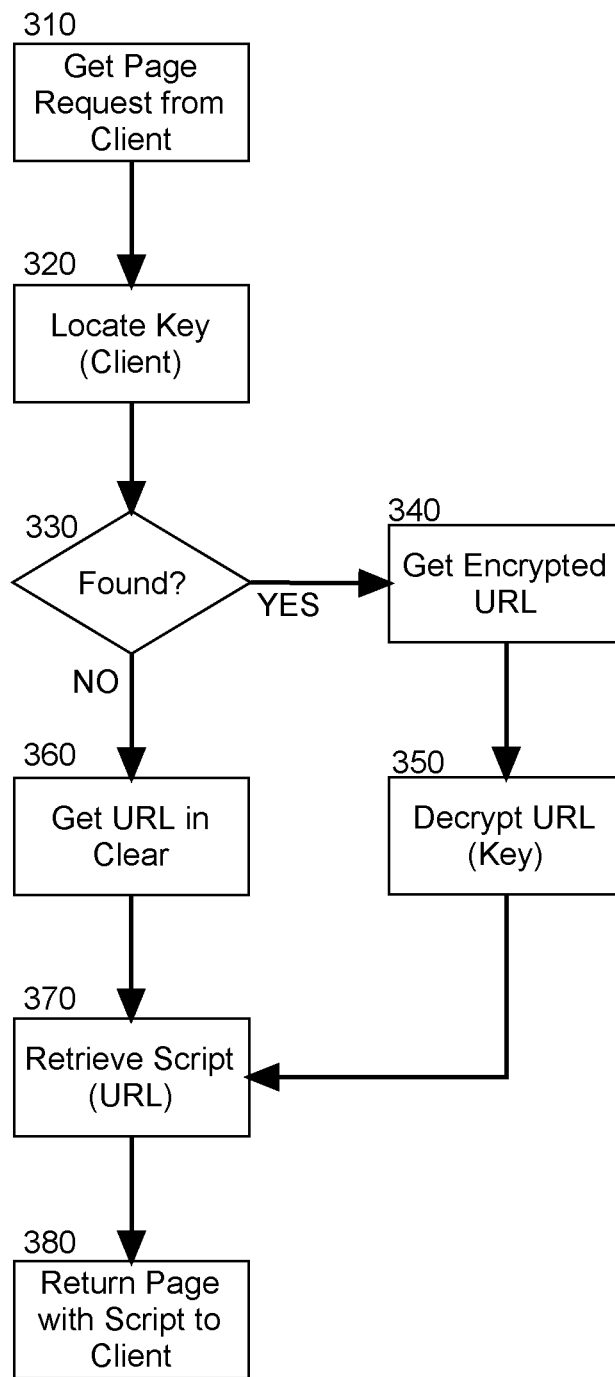

In event yet further illustration of the operation of the code obfuscation module 300, FIG. 3 is a flow chart illustrating a process for generating debuggable obfuscated script. Beginning in block 310, a Web page request for a Web page is received from over the Internet from a Web browser client of a remotely disposed computer. In block 320, it is determined if a cookie containing a key is present in the remotely disposed computer and accessible through the Web browser client. In decision block 330, if it is determined that the key is included in a cookie present in the remotely disposed client, in block 340 an encrypted URL is selected and in block 350, the encrypted URL is decrypted utilizing the key retrieved from the cookie. Otherwise, an unencrypted URL is selected in block 360. Thereafter, in block 370 a script associated with the selected URL is retrieved and embedded in the Web page. Finally, in block 380 the Web page including the retrieved script is served over the Internet to the remotely disposed client computer for display in the Web browser client by which the script is interpreted in a virtual machine of the remotely disposed computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A method for generating debuggable obfuscated script, the method comprising:
   embedding into a Web page, a query to a data store of a client requesting the Web page for a key disposed within fixed storage of the client;
   further embedding into the Web page both an encrypted network reference to an un-obfuscated, clear form of a script, the encrypted network reference being decryptable with the key, and also an un-encrypted reference to an obfuscated form of the script;
   yet further embedding into the Web page, a selection directive selecting and decrypting the encrypted network reference so as to retrieve the un-obfuscated, clear form of the script upon loading the Web page in the client on the condition that the key can be found in the fixed storage in response to the query, but otherwise selecting the un-encrypted reference so as to retrieve the obfuscated form of the script upon loading the Web page in the client; and,
   serving the Web page to the client over a computer communications network in response to a request by the client to retrieve the Web page.

2. The method of claim 1, wherein the key is stored in a cookie in the fixed storage of the client.

3. The method of claim 1, wherein the script is script interpretable in a virtual machine.

4. The method of claim 3, wherein the script comports with the Javascript scripting language.

5. The method of claim 1, wherein the network reference is a uniform resource locator (URL).

6. The method of claim 1, wherein the selection directive further confirms a checksum of the decrypted form of the encrypted network reference before permitting a selection of the decrypted form of the encrypted network reference.

* * * * *